United States Patent

Hanloser et al.

[11] Patent Number: 5,927,067
[45] Date of Patent: Jul. 27, 1999

[54] SELF-CLEANING AUGMENTOR FUEL MANIFOLD

[75] Inventors: Kurt J. Hanloser, Palm Beach Shores; John A. Harris, III, West Palm Beach, both of Fla.

[73] Assignee: United Technologies Corporation, Hartford, Conn.

[21] Appl. No.: 08/968,798

[22] Filed: Nov. 13, 1997

[51] Int. Cl.$^6$ .................................................. F02K 3/10
[52] U.S. Cl. ........................... 60/261; 60/39.094; 60/739
[58] Field of Search ...................... 60/39.094, 261, 60/739, 741

[56] References Cited

U.S. PATENT DOCUMENTS

| | | | |
|---|---|---|---|
| 4,170,111 | 10/1979 | Lewis et al. | 60/261 |
| 4,280,324 | 7/1981 | Arliiguie et al. | 60/261 |
| 4,398,388 | 8/1983 | Langston Jr. | 60/261 |
| 4,423,595 | 1/1984 | McLean | 60/261 |
| 4,720,971 | 1/1988 | DuBell | 60/204 |
| 4,730,453 | 3/1988 | Benoist et al. | 60/261 |
| 4,751,815 | 6/1988 | Moore | 60/261 |
| 4,765,136 | 8/1988 | Clements et al. | 60/261 |
| 4,833,881 | 5/1989 | Vdoviak et al. | 60/261 |
| 4,841,725 | 6/1989 | Farris | 60/261 |
| 4,989,407 | 2/1991 | Grant Jr. | 60/261 |
| 5,001,897 | 3/1991 | Schultz | 60/261 |
| 5,001,898 | 3/1991 | Holladay | 60/261 |
| 5,117,628 | 6/1992 | Koshoffer | 60/226.1 |
| 5,127,224 | 7/1992 | Barcza et al. | 60/261 |
| 5,269,137 | 12/1993 | Edwards III | 60/261 |
| 5,315,822 | 5/1994 | Edwards III | 60/261 |
| 5,367,874 | 11/1994 | Auffret et al. | 60/261 |
| 5,385,015 | 1/1995 | Clements et al. | 60/261 |

*Primary Examiner*—Louis J. Casaregola
*Attorney, Agent, or Firm*—Richard D. Getz

[57] ABSTRACT

A gas turbine augmentor fuel manifold is provided which includes a hollow body, a plurality of fuel valves and a cleansing port disposed in the hollow body, and apparatus for selectively admitting fuel into the hollow body. The hollow body has a forward surface and an aft surface. When the apparatus for selectively admitting fuel into the hollow body is in an off position, core gas flowing past the hollow body enters the cleansing port and purges the interior of the hollow body of residual fuel and fuel residue, thereby cleaning the hollow body.

5 Claims, 2 Drawing Sheets

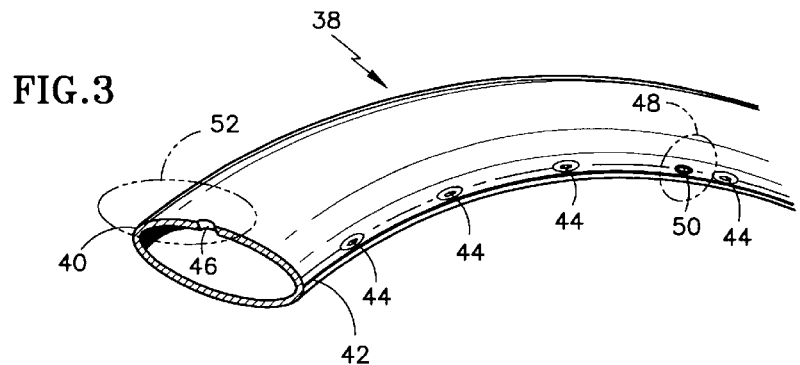
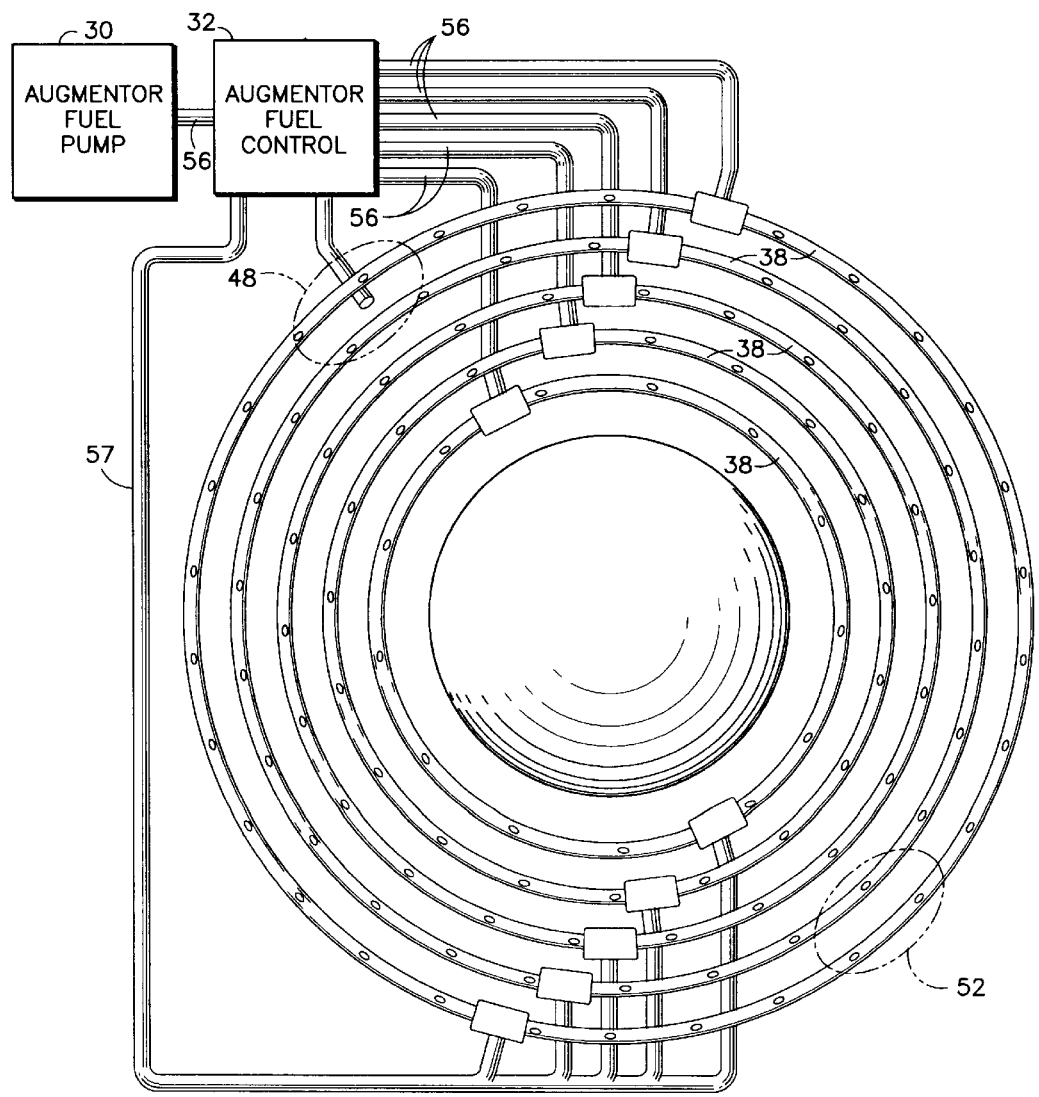

5,927,067

SELF-CLEANING AUGMENTOR FUEL MANIFOLD

The invention was made under a U.S. Government contract and the Government has rights herein.

BACKGROUND OF THE INVENTION

1. Technical Field

This invention relates to augmented gas turbine engines in general, and more specifically to apparatus for distributing fuel within an augmented gas turbine engine.

2. Background Information

Augmentors, or "afterburners", are a known means for increasing the thrust of a gas turbine engine. Thrust is produced within a gas turbine engine by compressing air with a fan and a compressor, adding fuel to the air within a combustor, igniting the mixture, and finally passing the combustion products (referred to as core gas) through a nozzle. A turbine positioned between the combustor and the nozzle extracts some of the energy added to the air to power the fan and compressor stages. In an augmented gas turbine engine, additional thrust is produced by adding fuel to the core gas exiting the turbine and igniting the mixture. An augmentor fuel pump supplies pressurized fuel to an augmentor fuel control which, in turn, distributes the fuel to a plurality of spray manifolds (or spray bars, nozzles, or the like) positioned within the core gas flow path aft of the turbine. The position of the spray manifolds within the core gas flow path promotes uniformity in the distribution of fuel. Mechanical flame holders are positioned downstream of the spray manifolds to create low velocity wakes where flame can be initiated and maintained.

The high temperature core gas exiting the turbine provides a severe thermal environment for the spray manifolds. Fuel left in the spray manifolds after augmentor demand has been canceled will thermally degrade and leave an undesirable residue, typically in the forms of solids, varnish, and gum-like materials. The solid residue is often referred to as "coke". The residue deposits can foul fuel injection sites within a spray manifold and/or clog the lines connecting spray manifolds to the fuel control. To minimize residue deposits, spray manifolds are typically provided with drains for dumping any fuel that remains in the spray manifolds and/or lines connecting the spray manifolds to the fuel control after augmentation. The dumped fuel atomizes within the core gas flow and exits the engine unburned with the exhaust. In some instances, however, fuel remains in the spray rings even after dumping is complete. The stationary residual fuel is particularly susceptible to the formation of residue.

What is needed, therefore, is an apparatus for distributing fuel in an augmentor that minimizes residue deposits within the fuel spray manifolds, and one that cleans any residue deposits that do form.

DISCLOSURE OF THE INVENTION

It is an object of the present invention, therefore, to provide an apparatus for distributing fuel within an augmentor that minimizes residue deposits within fuel spray manifolds.

It is another object of the present invention to provide an apparatus for distributing fuel within an augmentor that is self-cleaning.

According to the present invention, a gas turbine augmentor fuel manifold is provided which includes a hollow body, a plurality of fuel valves and a cleansing port disposed in the hollow body, and means for selectively admitting fuel into the hollow body. The hollow body has a forward surface and an aft surface. When the means for selectively admitting fuel into the hollow body is in an off position, core gas flowing past the hollow body enters the cleansing port and cleans the interior of the hollow body. In one embodiment of the present invention, an exit port is disposed in the hollow body. Core gas flow enters the hollow body by way of the cleansing port and, exits the hollow body via the exit port.

An advantage of the present invention is that residue deposits within the fuel spray manifolds are minimized or eliminated. High temperature core gas (greater than 1000° F.) enters each manifold and oxidizes any residue deposits within the manifold. The oxidation by-products the manifold and pass into with the core gas flow. Residue deposits and consequent blockage are thereby minimized or eliminated.

Another advantage of the present invention is that the fuel manifold is self-cleaning. Many prior art augmentor fuel manifolds must be removed from the engine to be cleaned of residue deposits. The present invention fuel manifold, in contrast, automatically cleans residue deposits when exposed to high temperature core gas, thereby increasing the durability of the manifold and decreasing maintenance costs associated with the augmentor.

These and other objects, features and advantages of the present invention will become apparent in light of the detailed description of the best mode embodiment thereof, as illustrated in the accompanying drawings.

BRIEF DESCRIPTION OF THE DRAWINGS

FIG. 3 is a diagrammatic sectional view of a fuel spray manifold, showing a cleansing port and an exit port.

FIG. 4 is a diagrammatic view of an augmentor with a plurality of fuel manifolds.

BEST MODE FOR CARRYING OUT THE INVENTION

Figure 1:
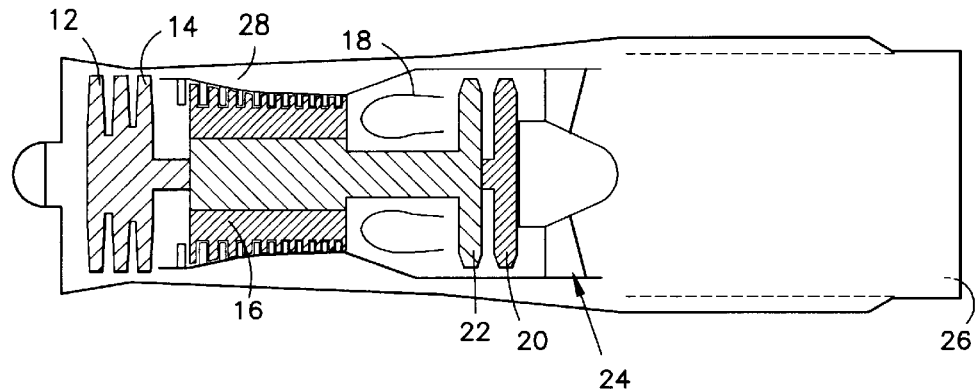
FIG. 1 is a diagrammatic view of an augmented gas turbine engine.

Referring to FIG. 1, a gas turbine engine 10 includes a fan 12, a low pressure compressor 14, a high pressure compressor 16, a combustor 18, a low pressure turbine 20, and a high pressure turbine 22, an augmentor 24, and a nozzle 26. The fan 12 is forward of the nozzle 26 and the nozzle 26 is aft of the fan 12. The fan 12 and the low pressure compressor 14 are connected to one another and are driven by the low pressure turbine 20. The high pressure compressor 16 is driven by the high pressure turbine 22. Air worked by the fan 12 will either enter the low pressure compressor 14 as "core gas" or will enter a passage 28 outside the engine core as "bypass air".

Figure 2:
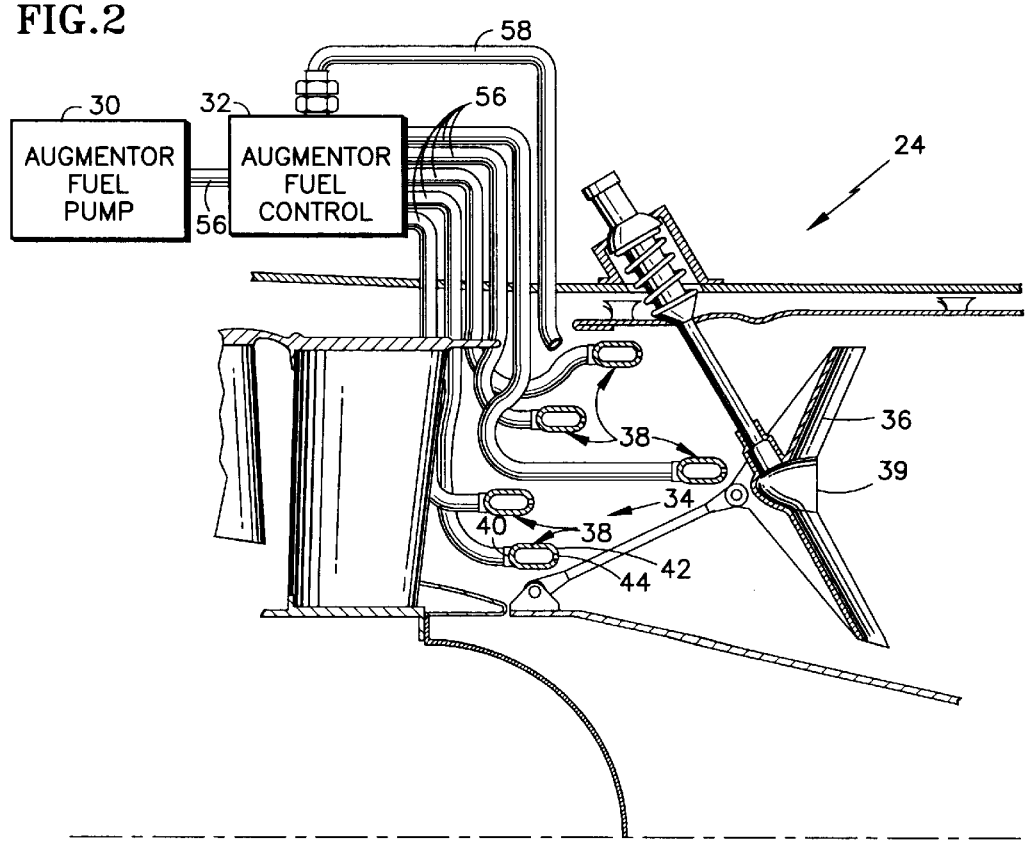
FIG. 2 is a diagrammatic partial view of a gas turbine engine augmentor.

Referring to FIGS. 2–4, the augmentor 24 includes an augmentor fuel pump 30, an augmentor fuel control 32, means 34 for distributing fuel, and a flame holder 36. The augmentor fuel pump 30 and control 32 are attached to an external surface (not shown) of the engine 10 adjacent the augmentor 24. The means 34 for distributing fuel includes a plurality of ring-shaped hollow fuel manifolds 38 disposed within the core gas flow path. A person of skill in the art will recognize that spray bars, or the like (not shown), may be used as an alternative to ring-shaped manifolds 38. Each ring-shaped manifold 38 (FIG. 3) includes a forward surface 40, an aft surface 42, a plurality of fuel valves 44, and a cleansing port 46. The valves 44, preferably variable orifice type valves, are circumferentially spaced to provide uniform fuel distribution. The cleansing port 46 is circumferentially positioned in a region 52 of relatively high pressure core gas. In an alternative embodiment, each manifold 38 further includes an exit port 50 circumferentially positioned in a region 48 of relatively low pressure core gas. The core gas pressure in the high region 52 is greater than the average core gas pressure adjacent the manifolds 38. The core gas pressure in the low region 48 is less than the average core gas pressure adjacent the manifolds 38. The flame holder 36 (FIG. 2) is an aerodynamic bluff body disposed in the core gas flow path downstream of the fuel manifolds 38. An ignition means 39 is normally positioned adjacent the aft side of the flame holder 36. Feed lines 56 (FIG. 4) connect the augmentor fuel pump 30 to the fuel control 32, and the fuel control 32 to the ring-shaped manifolds 38. Return lines 57 extend between the manifolds and the augmentor fuel control 32. A drain line 58 extends from the augmentor fuel control 32 into the core gas flow path adjacent the manifolds 38, preferably ending in a region 48 of relatively low pressure core gas. FIG. 5 shows the feed and return lines 56,57 diagrammatically for illustrative purposes. The actual lines will depend on the application.

In the operation of the device, the augmentor fuel pump 30 selectively provides pressurized fuel to the augmentor fuel control 32, and the fuel control 32 distributes it to the ring-shaped manifolds 38. The fuel subsequently fills and pressurizes the manifolds 38 and is discharged into the core gas via the manifold valves 44. The mixture of core gas and fuel is ignited and combustion is sustained until the fuel supply terminates. The fuel pressure in the manifolds 38 under augmentation is much greater than the core gas pressure adjacent the fuel manifolds 38.

When augmentor demand is terminated (i.e., when the fuel pump 30 is switched to an off position), fuel flow to the manifolds 38 stops and the manifold valves 44 close immediately or shortly thereafter. At this point, the augmentor fuel control 32, the feed and return lines 56,57, and the manifolds 38 are filled with fuel at, or near, the pressure established by the augmentor fuel pump 30. At approximately the same time, a drain valve (not shown) disposed within the augmentor fuel control 32 opens and allows the pressurized fuel to exit the fuel control 32, feed lines 56, and manifolds 38 via the return lines 57 and drain line 58. The pressure difference driving the fuel out of the manifolds 38 dissipates as the fuel drains. When the internal manifold 38 pressure drops enough, high temperature core gas begins to enter the cleansing hole 46 of each manifold 38, thereby increasing the temperature and pressure within the manifold 38. The increase in pressure aids in purging residual fuel out of the manifolds 38 and lines 56,57, and finally out the drain line 58. Removing fuel from the manifolds 38 minimizes the amount of fuel that might otherwise thermally degrade and change to residue. The increase in temperature causes whatever residue has formed to oxidize into a gaseous form, which subsequently weeps out of the manifold valves 44 or passes out of the drain line 58. In the embodiment having an exit port 50, the core gas entering each manifold 38 via the cleansing port 46 may also exit via the exit port 50. Locating the exit port 50 in a region 48 of relatively low pressure core gas facilitates the purging process. Pressure gradients within the core gas will vary depending on the application, and can be determined empirically.

In sum, core gas entering each hollow fuel manifold 38 via the cleansing port 46 minimizes or eliminates residual fuel and fuel residue within that manifold 38. Hence, the manifold 38 is "self-cleaning". Although this invention has been shown and described with respect to the detailed embodiments thereof, it will be understood by those skilled in the art that various changes in form and detail thereof may be made without departing from the spirit and scope of the claimed invention.

We claim:

1. A gas turbine augmentor fuel manifold, comprising:

a hollow body, having a forward surface and an aft surface;

a plurality of fuel valves, disposed in said hollow body;

a cleansing port, disposed in said hollow body;

means for selectively admitting fuel into said hollow body, having an off position in which fuel is not admitted into said hollow body;

wherein when said means for selectively admitting fuel into said hollow body is in said off position, core gas flowing past said hollow body enters said cleansing port and cleans said hollow body.

2. A gas turbine augmentor fuel manifold according to claim 1, wherein said core gas entering said hollow body bleeds out of said hollow body via said fuel valves.

3. A gas turbine augmentor fuel manifold according to claim 1, further comprising:

an exit port, disposed in said hollow body.

4. A gas turbine augmentor fuel manifold according to claim 3, wherein said cleansing port is circumferentially positioned to coincide with a first area of core gas flowing past said hollow body, said core gas having a first pressure in said first area, and said exit port is circumferentially positioned to coincide with a second area of core gas flowing past said hollow body, said core gas having a second pressure in said second area; and wherein said first pressure is greater than said second pressure.

5. A gas turbine augmentor fuel manifold according to claim 1, wherein said cleansing port is circumferentially positioned to coincide with an area of core gas flowing past said hollow body, having a pressure greater than an average pressure of the core gas.

* * * * *